United States Patent [19]

Snavely

[11] 4,104,322

[45] Aug. 1, 1978

[54] RUBBER COMPOSITIONS CONTAINING POLYSILOXANE ELASTOMERS AND BUTADIENE-STYRENE COPOLYMERS

[75] Inventor: Kenneth E. Snavely, Bartlesville, Okla.

[73] Assignee: Phillips Petroleum Company, Bartlesville, Okla.

[21] Appl. No.: 598,898

[22] Filed: Jul. 24, 1975

[51] Int. Cl.$^2$ .............................................. C08L 83/04
[52] U.S. Cl. ............................ 260/827; 260/37 SB; 260/42.47
[58] Field of Search ........................................ 260/827

[56] References Cited

U.S. PATENT DOCUMENTS

| | | | |
|---|---|---|---|
| 2,867,603 | 1/1959 | Safford et al. | 260/827 |
| 3,021,292 | 2/1962 | Hurd et al. | 260/827 |
| 3,051,684 | 8/1962 | Morton et al. | 260/46.5 |
| 3,121,069 | 2/1964 | Dietz | 260/827 |
| 3,715,411 | 2/1973 | Day et al. | 260/827 |

FOREIGN PATENT DOCUMENTS 1,170,277 9/1958 France.
1,284,082 8/1972 United Kingdom.

*Primary Examiner*—Paul Lieberman

[57] ABSTRACT

Blends of silicone rubber and hydrocarbon rubber provide novel compositions useful for industrial applications.

14 Claims, No Drawings

RUBBER COMPOSITIONS CONTAINING POLYSILOXANE ELASTOMERS AND BUTADIENE-STYRENE COPOLYMERS

This invention relates to the field of silicone rubbers. More particularly, the invention relates to blends of silicone rubber.

BACKGROUND OF THE INVENTION

Silicone rubbers are special polymers with some outstanding properties. Particularly, environmental resistance, the resistance to acids, bases and oil, the good tensile strength, the durability and the wide range of service temperatures as well as the low compression set properties, the nontoxic nature and the ease of processing are characteristic properties for the silicone rubber. However, the cost of silicone rubbers is relatively high and this fact has retarded their general acceptance.

THE INVENTION

It is one object of this invention to provide novel polymer mixtures.

Another object of this invention is to provide a mixture of silicone rubber with other polymers having acceptable properties.

Another object of this invention is to provide articles molded from silicone rubber-containing materials.

Still a further object of this invention is to provide a process for the production of molded articles from silicone rubber-comprising materials.

These and other objects, features, advantages and embodiments of this invention will become apparent to those skilled in the art from the following detailed description of the invention, the examples and the appended claims.

In accordance with this invention I have now discovered that silicone rubber when blended with hydrocarbon rubber selected from the group of solution polymerized hydrocarbon rubber, emulsion polymerized hydrocarbon rubber and mixtures thereof in such a quantity that the total blend contains Z weight percent or less hydrocarbon rubber, Z being defined by $$Z = 15 + 25 \cdot (P/100)$$

wherein P which can be any value from 0 to 100, is the weight percentage of the solution polymerized rubber in the total hydrocarbon rubber of the blend, can be cured so as to provide a product with properties comparable to those of pure silicone rubber. The rubber blends of this invention preferably contain 40 weight percent or less of solution formed hydrocarbon rubber (P = 100) or 15 weight percent or less of emulsion polymerized hydrocarbon rubber (P = 0); preferably the rubber blend of this invention contains at least 0.1 weight percent of the hydrocarbon rubber.

Silicone rubbers which can be used in accordance with this invention as the main ingredient of the mixture are those having the general formula

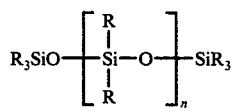

wherein the radicals R, which can be the same or different, are alkyl, cycloalkyl, or aryl radicals all of which can be either unsubstituted or substituted by alkyl, cycloalkyl and aryl radicals, each radical R having not more than about 12 carbon atoms, and wherein a small portion of the radicals R can be olefinically unsaturated radicals. The small portion of radicals R which are olefinically unsaturated can be a portion of up to about 5 percent of the radicals. Preferably, only up to about 1 percent of the radicals R are olefinically unsaturated radicals. These unsaturated radicals preferably are alkenyls with 2 to 12 carbon atoms. Presently, vinyl radicals are preferred for the small unsaturated portion mentioned above. The unsaturated portion of the radicals R facilitates the curing of the silicone rubber. Examples for the radicals R are methyl, ethyl, isopropyl, n-hexyl, cyclohexyl, phenyl, p-tolyl, benzyl, 4-(n-butyl)phenyl, and 1-dodecyl. The values $n$ can be in the range of about 500 to about 20,000. Preferably, the range for the value of n is about 3,000 to about 10,000. Mixtures of the above-defined silicone rubbers can also be used for the purposes of this invention.

The hydrocarbon rubbers useful in the blends of this invention are homopolymers or copolymers of conjugated dienes. The conjugated dienes contain from 4 to about 12 carbon atoms per molecule, those containing from 4 to 8 carbon atoms per molecule being preferred. Both acyclic and cyclic conjugated dienes are useful monomers for the hydrocarbon rubbers in accordance with this invention. Examples for the dienes, homopolymers or copolymers of which are suitable hydrocarbon rubbers in the blends of this invention, are 1,3-butadiene, isoprene, 2,3-dimethyl-1,3-butadiene, 1,3-cyclohexadiene, piperylene, 3-butyl-1,3-octadiene, and 2-phenyl-1,3-butadiene. For the embodiment of the invention wherein the hydrocarbon rubbers are copolymers of the above-mentioned conjugated dienes, the other monomer is selected from the group of the vinylaromatic hydrocarbons having 8 to about 18 carbon atoms per molecule. These vinylaromatic hydrocarbons are either unsubstituted or substituted on the aromatic ring by alkyl, cycloalkyl, aryl, alkaryl and aralkyl radicals. Examples of the vinylaromatic hydrocarbons are styrene, 3-methylstyrene, 4-n-propylstyrene, 4-cyclohexylstyrene, 4-n-hexylstyrene, 4-benzylstyrene, 4-p-tolylstyrene, 4-phenylstyrene, 1-vinylnaphthalene, 2-vinylnaphthalene, 1-vinyl-3-propylnaphthalene, 2-vinyl-5-hexylnaphthalene. The copolymer hydrocarbon rubbers useful in this embodiment of the invention can be random copolymers or block copolymers.

The hydrocarbon rubbers which are presently preferred to be incorporated into the rubber blend of this invention are homopolymers of butadiene and isoprene and copolymers of styrene and an alkadiene selected from the group consisting of butadiene and isoprene. Preferably, the conjugated dienes are present in the hydrocarbon copolymers in a major amount as compared to the vinylaromatic monomer.

The silicone rubber/hydrocarbon rubber blends of this invention contain practically no ingredient that will detrimentally interfere with the curing of the silicone rubber. Thus, the mixture is essentially free of sulfur and sulfur-containing compounds. In addition, the mixture should not contain excessive amounts of carboxyl group containing compounds, particularly ionic surfactants, water, and antioxidants. All these compounds interfere detrimentally with the curing reaction of the silicone rubber. Among the sulfur-containing compounds, the mercaptans acting as chain transfer agents and the dithiocarbamates acting as shortstops, are particularly detrimental. Among the ionic surfactants, the fatty acid soaps, the rosin acid soaps, and the alkylaromatic alkaline sulfonates have to be minimized in the rubber mixture. Antioxidants, e.g., tris(nonylphenyl)phosphite, are also detrimental and excessive amounts are to be avoided in the inventive blends.

The practical precise upper tolerance limits for the above-mentioned deleterious compounds in a silicone rubber-hydrocarbon rubber blend depend upon various factors, particularly the nature of the contaminant, the content of hydrocarbon rubber and the state of cure desired. The following upper limits in weight percent of the total silicone rubber-hydrocarbon rubber blend, as well as the preferred upper limit for these compounds are shown in the following table:

| Contaminant | Upper limit (weight % of total blend) | Preferred upper limit (weight % of total blend) |
|---|---|---|
| Sulfur containing compound (e.g. tert. $C_{12}$-mercaptan, sodium dimethyl dithio-carbamate, sodium salts of polymerized alkyl naphthalene sulfonic acid) | 0.003 (calculated as S) | 0.002 |
| Ionic surfactants (e.g. potassium fatty acid soap, rosin acid soap) | 0.07 | 0.03 |
| Water | 0.03 | 0.01 |
| Antioxidants | 0.1 | 0.04 |

The preferred blends of this invention contain 60 weight percent or more of silicone rubber and 40 percent or less of solution formed hydrocarbon rubber. The preferred lower limit for the solution polymerized hydrocarbon rubber in the rubber blend of this invention is about 0.1 weight percent.

In case the rubber blend of this invention contains emulsion polymerized hydrocarbon rubber, the range for this hydrocarbon rubber in the blend is limited to about 15 weight percent or less of the total mixture. Preferably, the blend of this invention contains about 10 weight percent or less of the emulsion-polymerized hydrocarbon rubber. The preferred lower limit for the emulsion-polymerized hydrocarbon rubber is 0.1 weight percent of the total blend.

The blending of the two rubbers can be carried out by conventional blending techniques. For example, a roll mill or an internal mixer can be employed to blend the silicone rubber with the hydrocarbon rubber. Further compounding ingredients can also be added through the use of such conventional blending techniques.

The rubber blends of this invention can also contain conventional additives. Preferably, however, the rubber blend of this invention does not contain carbon black and associated compounding ingredients typical in a carbon black formation because they are detrimental to ozone and aging resistance. However, the rubber blend of this invention can contain various pigments and other fillers such as fume process silicas, silica aerogels, calcined kaolin, precipitated calcium carbonate, zirconium silicate, iron oxide, calcium carbonate. All additives employed have to be essentially free of the detrimental ingredients as defined above. Essentially free means in this context that the total rubber blend to which those additives have been added does not contain an unacceptable amount of said detrimental ingredients as defined above.

In accordance with a further embodiment of this invention, a process for producing rubber articles is provided. This process comprises blending a silicone rubber and a hydrocarbon rubber as defined above resulting in a rubber mixture being essentially free of the detrimental ingredients as defined, adding a curing agent which is capable of curing silicone rubber to the mixture to produce a raw material, molding said raw material into an article of desired shape and curing said shaped article. This process has the advantage of resulting in a cured silicone rubber-containing article having essentially the same properties as the same article made from pure silicone rubber but being considerably less expensive than the article from pure silicone rubber. The upper weight limits for the detrimental ingredients are the same as defined above.

The curing agents which can be used in this process are those which are generally employed for curing silicone rubbers. The preferred class of curing agents are the peroxides. Examples for the curing agents are bis(2,4-dichlorobenzoyl) peroxide, dibenzoyl peroxide, dicumyl peroxide, 2,5-dimethyl-2,5-bis(t-butylperoxy)-hexane, and di-t-butyl peroxide. As emphasized above, sulfur and sulfur compounds as well as other detrimental ingredients have to be avoided in the rubber blend.

In accordance with a still further embodiment of this invention, molded articles are provided which consist essentially of a cured mixture of silicone rubber, hydrocarbon rubber and a curing agent for the silicone rubber and are essentially free of detrimental ingredients as defined above. The silicone rubber, hydrocarbon rubber and curing agents and the upper weight limits of the detrimental ingredients for this article of manufacture are the same as defined above.

The invention will be more fully understood from the following examples which show preferred embodiments of this invention which are, however, not intended to limit the scope thereof.

EXAMPLE I

In a midget Banbury mixer operated with a jacket temperature of 140° F. and at 120 RPM, ingredients in quantities as shown in the following table were blended until a homogeneous blend was produced. The rubber ingredients were blended first and then the curing agent was added. The quantity of ingredients shown in the following table are given in parts by weight. After a homogeneous mixture was formed, the rubber blends were milled on a two-roll mill and sheeted-off at 0.1 inch thickness. Samples were cut therefrom, cured at 330° F. and tested for both original and aged mechanical properties. The results are shown in the following Table I.

TABLE I

| Blend Components, phr[a] | | | | | | | |
|---|---|---|---|---|---|---|---|
| Silicone rubber A[b] | 100 | 90 | 80 | 70 | 90 | 80 | 70 |
| Solution rubber A[c] | 0 | 10 | 20 | 30 | 0 | 0 | 0 |
| Emulsion rubber[d] | 0 | 0 | 0 | 0 | 10 | 20 | 30 |
| Varox[e] | 1 | 1 | 1 | 1 | 1 | 1 | 1 |
| Before aging[f] | | | | | | | |
| Tensile, psi[g] | 970 | 905 | 850 | 915 | 915 | 610 | 545 |
| Elongation, %[g] | 450 | 380 | 250 | 200 | 510 | 550 | 320 |
| Shore A Hardness[h] | 42 | 50 | 53 | 58 | 45 | 41 | 40 |

TABLE I-continued

| Blend Components, phr[a] | | | | | | | |
|---|---|---|---|---|---|---|---|
| Ozone Exposure, 3 da.[i] | 0 | 0 | 0 | 0 | 0 | 0 | 0 |
| Aged 70 hrs. at 300° F. (149° C.)(aluminum block) | | | | | | | |
| Tensile, psi | 1210 | 905 | 940 | 880 | 1000 | 795 | 500 |
| Elongation, % | 520 | 340 | 200 | <100 | 460 | 270 | <100 |
| Shore A Hardness | 44 | 56 | 68.5 | 77.5 | 55 | 63 | 73 |
| Aged 70 hrs. at 400° F. (204° C.) (aluminum block) | | | | | | | |
| Tensile, psi | 710 | 700 | 595 | 505 | 705 | 450 | 205 |
| Elongation, % | 430 | 230 | 100 | <100 | 300 | 145 | <100 |
| Shore A Hardness | 40 | 45 | 60 | 70 | 45 | 53 | 70 |
| Aged 70 hrs. at 350° F. (177° C.) in ASTM No. 1 Oil (aluminum block) | | | | | | | |
| Tensile, psi | 710 | 760 | 720 | 750 | 610 | 420 | 235 |
| Elongation, % | 350 | 370 | 235 | 155 | 440 | 465 | 160 |
| Shore A Hardness | —[j] | — | — | — | — | — | — |

[a]Parts by weight per hundred parts rubber.
[b]Blensil Silicone Rubber Compound SE-44U ® (General Electric Co.); color offwhite; spec. grav. 1.13 ± 0.02; methyl vinyl siloxane polymer. (General Electric Co. bulletin CDS-2158) Mooney Viscosity ML-4 at 212° F.; 15. (ASTM D 1646-63)
[c]A 75 butadiene/25 styrene solution polymerized rubber; initiator; organolithium; randomized by tetrahydrofuran and branched with stannic chloride. ML-4 at 212° F.; 56. Solprene ® 1204 (Phillips Petroleum Co.).
[d]SBR 1502, a random 76.5 weight percent butadiene/23.5 weight percent styrene emulsion polymerized rubber having a Mooney viscosity of 52 ML-4 at 212° F.
[e]A curing agent containing equal parts of 2,5-di(t-butylperoxy)-2,5-dimethylhexane and an inert free-flowing mineral carrier.
[f]Cured 15 min. at 330° F.
[g]Determined in accordance with ASTM D-412-66.
[h]Determined in accordance with ASTM D-2240-68.
[i]Determined in accordance with ASTM D-1149-64; ASTM D 1171-66 with the modification that the crack rating (in inches) applied is: (0) — none, (1) — 0.010, (2) — 0.020, (3) — 0.30, (4) — 0.40, (5) — 0.50, (6) — 0.60, (7) — 0.070, (8) — 0.080, (9) — 0.110, (10) — 0.150. (0) is best.
[j]Dash denotes no determination.

The data shown in Table I indicate that the blends of this invention have good tensile strength when they contain about 30 weight percent or less of solution-polymerized randomized butadiene/styrene rubber. The results were good even after the samples had been aged at elevated temperatures. Using an emulsion polymerized rubber, the blends containing more than about 10 weight percent hydrocarbon rubber showed relatively poor tensile strength and elongation. The ozone resistance was good with all of these blends.

EXAMPLE II

Example I was repeated utilizing 100 parts by weight of silicone rubber, 1 part by weight of Varox and, in addition, small quantities of sulfur. Three runs were carried out using 0.1, 0.5, and 1.0 part by weight of sulfur in the blend. It was found that the samples could not be cured. Thus, the sulfur content of the blend has to be considerably below 0.1 part by weight per 100 parts by weight of rubber.

EXAMPLE III

Example I was repeated utilizing, however, the compositions specified in the following Table II. The solution-polymerized rubber in this example is a block copolymer. The blends were cured at 330° F. (166° C.) for 15 minutes. The results of the evaluation are shown in the Table II below. Unless otherwise indicated, the agents used and the determination methods applied are the same as in Example I.

TABLE II

| Blend Components, phr | | | | | | | | | | |
|---|---|---|---|---|---|---|---|---|---|---|
| Silicone rubber B[a] | 100 | 80 | 70 | 60 | 50 | 0 | 0 | 0 | 0 | 50 |
| Silicone rubber A | 0 | 0 | 0 | 0 | 0 | 0 | 30 | 40 | 50 | 0 |
| Solution Rubber B[b] | 0 | 20 | 30 | 40 | 50 | 100 | 70 | 60 | 50 | 0 |
| Emulsion rubber | 0 | 0 | 0 | 0 | 0 | 0 | 0 | 0 | 0 | 50 |
| Carbon black[c] | 0 | 0 | 0 | 0 | 0 | 50 | 50 | 50 | 50 | 0 |
| Varox | 1 | 1 | 1 | 1 | 1 | 2 | 2 | 2 | 2 | 1 |
| Aromatic oil | 0 | 0 | 0 | 0 | 0 | 10 | 10 | 10 | 10 | 0 |
| Zinc oxide | 0 | 0 | 0 | 0 | 0 | 3 | 3 | 3 | 3 | 0 |
| Stearic acid | 0 | 0 | 0 | 0 | 0 | 2 | 2 | 2 | 2 | 0 |
| Before aging | | | | | | | | | | |
| Tensile, psi | 1175 | 1100 | 1000 | 955 | 785 | 2120 | 1350 | 960 | 710 | 580 |
| Elongation, % | 130 | 110 | 110 | 100 | 90 | 290 | 200 | 150 | 130 | 190 |
| Shore A Hardness | 79 | 82 | 83 | 79 | 78 | 80 | 81 | 83 | 81 | 58 |
| Ozone Exposure, 1/6/28 da. | 0/0/0 | 0/0/0 | 0/0/0 | 0/0/0 | 0/0/0 | 10/X/X | 10/X/X | 10/X/X | 8/10/X | 0/6/10 |
| Aged 48 hrs. at 400° F. (204° C.) (Aluminum block) | | | | | | | | | | |
| Tensile, psi | 1010 | 1100 | 1005 | (d) | (d) | (d) | (d) | (d) | (d) | (d) |
| Elongation, % | 100 | 65 | 10 | (d) | (d) | (d) | (d) | (d) | (d) | (d) |
| Shore A | | | | | | | | | | |

TABLE II-continued

| Blend Components, phr | | | | | | | | | | |
|---|---|---|---|---|---|---|---|---|---|---|
| Hardness | 83 | 93 | 92 | 88 | 88 | 87 | 86 | 97 | 94 | 87 |

(a)Blensil Silicone Rubber Compound, SE-88U ®(General Electric Co.); color, tan; spec. grav. 1.40 ± 0.02 g/cc; methyl vinyl siloxane polymer. (General Electric Co. bulletin CDS-2158); ML-4 at 212° F.; 38, (ASTM D 1646–63).
(b)A 7 butadiene/25 styrene solution-polymerized rubber; initiator; organolithium; 18% block polystrene; fatty acid terminated; ML-4 at 212° F.; 47.
(c)Industry Reference Black No. 3.
(d)Sample crumbled.
X Sample broke.

From the above results it can be determined that blends containing about 40 weight percent or less of solution-polymerized hydrocarbon rubber exhibit good tensile strength before aging. After aging the tensile strength was good in blends which contained 30 weight percent or less solution-polymerized hydrocarbon rubber. The blends containing carbon black and extender oil exhibited poor ozone resistance whereas the other blends performed as well in that respect as the silicone rubber itself.

EXAMPLE IV

Blends were prepared as in Example I employing the compositions shown in the following table. The blends after extrusion and cutting into samples were cured at 330° F. (166° C.) for 15 minutes. These cured samples were then evaluated as in Example I. The results are shown in the following Table III. The solution-polymerized hydrocarbon rubber is the block copolymer of butadiene and styrene that was used in Example III.

TABLE III

| Blend Components phr | | | | | | | |
|---|---|---|---|---|---|---|---|
| Silicone rubber A | 100 | 90 | 80 | 70 | 90 | 80 | 70 |
| Solution rubber B | 0 | 10 | 20 | 30 | 0 | 0 | 0 |
| Emulsion rubber | 0 | 0 | 0 | 0 | 10 | 20 | 30 |
| Varox | 1 | 1 | 1 | 1 | 1 | 1 | 1 |
| Before Aging | | | | | | | |
| Tensile, psi | 1130 | 920 | 775 | 745 | 935 | 660 | 515 |
| Elongation, % | 480 | 380 | 270 | 200 | 500 | 550 | 310 |
| Shore A Hardness | 42 | 52 | 56 | 61 | 45 | 42 | 40 |
| Ozone exposure, 18 da. | 0 | 0 | 0 | 0 | 0 | 0 | 0 |
| Aged 70 hrs. at 300° F. (149° C.) (aluminum block) | | | | | | | |
| Tensile, psi | 1000 | 880 | 920 | 885 | 920 | 795 | 675 |
| Elongation, % | 470 | 380 | 210 | <100 | 420 | 270 | <100 |
| Shore A Hardness | 45 | 57 | 68 | 82 | 58 | 65 | 76 |
| Aged 70 hrs. at 400° F. (204° C.) (aluminum block) | | | | | | | |
| Tensile, psi | 890 | 750 | 595 | 680 | 735 | 515 | 295 |
| Elongation, % | 500 | 270 | 100 | <100 | 290 | 140 | <100 |
| Shore A Hardness | 39 | 45 | 59 | 76 | 47 | 54 | 71 |
| Aged 70 hrs. at 350° F. (177° C.) in ASTM No. 1 Oil (aluminum block) | | | | | | | |
| Tensile, psi | 950 | 830 | 630 | 560 | 630 | 400 | 220 |
| Elongation, % | 460 | 430 | 300 | 110 | 445 | 420 | 120 |
| Shore A Hardness | 39 | 42 | 47.5 | 59 | 38 | 37 | 35 |

The results shown in Table III above are similar to those in corresponding blends of Example I. This shows that block copolymers of hydrocarbon rubber are roughly as useful as random copolymers.

EXAMPLE V

Blends were prepared as in Example I utilizing the ingredients shown in the following Table IV. The shaped samples after extrusion and cutting were again cured at 330° F. for 15 minutes. The evaluation data obtained are shown in the following table.

TABLE IV

| Blend Components phr | | | | | | | | | |
|---|---|---|---|---|---|---|---|---|---|
| Silicone rubber A | 100 | 90 | 80 | 90 | 90 | 0 | 10 | 20 | 30 |
| Solution rubber A | 0 | 10 | 20 | 0 | 0 | 100 | 90 | 80 | 70 |
| Solution rubber B | 0 | 0 | 0 | 10 | 0 | 0 | 0 | 0 | 0 |
| Solution rubber C(a) | 0 | 0 | 0 | 0 | 10 | 0 | 0 | 0 | 0 |
| Varox | 1 | 1 | 1 | 1 | 1 | 4 | 4 | 4 | 4 |
| Carbon black(b) | 0 | 0 | 0 | 0 | 0 | 50 | 50 | 50 | 50 |
| Aromatic oil | 0 | 0 | 0 | 0 | 0 | 10 | 10 | 10 | 10 |
| Zinc oxide | 0 | 0 | 0 | 0 | 0 | 3 | 3 | 3 | 3 |
| Stearic acid | 0 | 0 | 0 | 0 | 0 | 2 | 2 | 2 | 2 |
| Before Aging | | | | | | | | | |
| Tensile, psi | 1030 | 970 | 880 | 880 | 930 | 1440 | 1540 | 1400 | 1410 |
| Elongation, % | 590 | 470 | 360 | 500 | 470 | <100 | <100 | <100 | <100 |
| Shore A Hardness | 41 | 47 | 51.5 | 48 | 47 | 74 | 76 | 76.5 | 79 |
| Ozone exposure, 1/13 da. | 0/0 | 0/0 | 0/0 | 0/0 | 0/0 | 10/X | 10/X | 10/X | 10/X |
| Aged 70 hrs./450° F. (232° C.) (Aluminum block) | | | | | | | | | |

TABLE IV-continued

| Blend Components phr | | | | | | | | | |
|---|---|---|---|---|---|---|---|---|---|
| Tensile, psi | 495 | 495 | 420 | 460 | 325 | (c) | (c) | 740 | 360 |
| Elongation, % | 385 | 180 | 95 | 185 | 100 | (c) | (c) | <10 | <10 |
| Shore A Hardness | 26.5 | 41 | 54 | 36.5 | 43.5 | 95 | 91 | 91 | 92 |
| Aged 70 hrs./350° F. (177° C.) in ASTM No. 1 Oil (aluminum block) | | | | | | | | | |
| Tensile, psi | 770 | 750 | 670 | 775 | 600 | 660 | 710 | 780 | 770 |
| Elongation, % | 485 | 470 | 320 | 500 | 370 | 50 | 40 | 45 | 50 |
| Shore A Hardness | 35 | 45 | 52 | 47 | 42 | 73 | 78 | 78 | 77 |

(a)A 52 butadiene/48 styrene solution-polymerized rubber; initiator; organolithium; randomized by tetrahydrofuran and shortstopped with fatty acid. ML-4 at 212° F.; 48.
(b)N330.
(c) Sample was too brittle to measure.

The results in the above table indicate that the blends of this invention are limited to smaller amounts of hydrocarbon rubber and larger amounts of silicone rubber. Employing, for instance, 30 parts by weight of silicone rubber and 70 parts by weight of a solution-polymerized hydrocarbon rubber resulted in cured samples which had very poor ozone resistance and unsatisfactory elongation.

The results also show that larger amounts of carbon black and aromatic oil have a detrimental effect on the performance of the rubber blend. These ingredients therefore preferably are avoided in the rubber blend of this invention.

Reasonable variations and modifications which will be apparent to those skilled in the art can be made in this invention without departing from the spirit and scope thereof.

I claim:
1. A rubber blend comprising:
 a. a silicone rubber having a formula

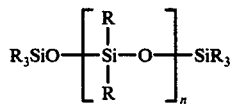

wherein the radicals R, which can be the same or different, can be alkyl, cycloalkyl, aryl radicals which can be unsubstituted or substituted by alkyl, cycloalkyl and aryl radicals, said radicals R containing 1 to about 12 carbon atoms and wherein 0 to about 5 percent of the radicals R are olefinically unsaturated radicals having from 2 to about 12 carbon atoms,
 b. Z weight percent or less of the total blend of a hydrocarbon rubber selected from the group consisting of solution polymerized hydrocarbon rubbers, emulsion polymerized hydrocarbon rubbers, and mixtures thereof, Z being defined by the formula $$Z = 15 + 25 \cdot (P/100)$$

wherein P which can be any value between 0 and 100 is the weight percentage of solution polymerized hydrocarbon rubber in the total hydrocarbon rubber of the blend, said hydrocarbon rubber being a copolymer of a conjugated alkadiene having 4–12 carbon atoms per molecule and a vinyl-substituted aromatic monomer of 8 to about 18 carbon atoms, and c. up to 0.003 weight % (calculated as sulfur) of sulfur or a sulfur-containing compound,
 up to 0.07 weight % ionic surfactants,
 up to 0.03 weight % water,
 up to 0.1 weight % antioxidants.
2. A rubber blend in accordance with claim 1 containing the silicone rubber and the solution polymerized hydrocarbon rubber in a weight ratio in the range of 60:40 to 99.9:0.1.
3. A rubber blend in accordance with claim 1 containing said silicone rubber and the emulsion-polymerized hydrocarbon rubber in a weight ratio in the range of 85:15 to 99.9:0.1.
4. A rubber blend in accordance with claim 3 wherein said weight ratio is in the range of 90:10 to 99.9:0.1.
5. A rubber blend in accordance with claim 1 wherein said radicals R are methyl radicals and 0 to 5 percent vinyl radicals.
6. A rubber blend in accordance with claim 1 wherein said alkadienes are selected from the group consisting of butadiene and isoprene.
7. A rubber blend in accordance with claim 1 wherein said hydrocarbon rubber is a solution-polymerized copolymer of styrene and an alkadiene selected from the group consisting of isoprene and butadiene.
8. A rubber blend in accordance with claim 1 which is essentially free of sulfur and sulfur containing compounds.
9. A process for the production of a cured, molded rubber article comprising
 (a) blending a silicone rubber having the general formula

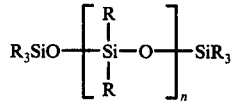

wherein the radicals R, which can be the same or different, can be alkyl, cycloalkyl, aryl radicals which can be unsubstituted or substituted by alkyl, cycloalkyl and aryl radicals, said radicals R containing 1 to about 12 carbon atoms and wherein 0 to about 5 percent of the radicals R are olefinically unsaturated radicals having from 2 to about 12 carbon atoms, n being an integer, a hydrocarbon rubber in quantities as defined in claim 1 to result in a rubber blend, and a curing agent for the silicone rubber to form a raw material,
 (b) forming an article from said raw material, and
 (c) curing said article at the operating curing temperature for the curing agent.

10. A process in accordance with claim 9 wherein said radicals R are methyl radicals and 0 to 5 percent vinyl radicals.

11. A process in accordance with claim 10 wherein said alkadienes are selected from the group consisting of butadiene and isoprene.

12. A process in accordance with claim 9 wherein said hydrocarbon rubber is a solution-polymerized copolymer of styrene and an alkadiene selected from the group consisting of butadiene and isoprene.

13. A process in accordance with claim 9 wherein the rubber blend is essentially free of sulfur and sulfur containing compounds.

14. As an article of manufacture the product of the process in accordance with claim 9.

* * * * *